United States Patent
Zhang et al.

(10) Patent No.: US 10,459,756 B1
(45) Date of Patent: Oct. 29, 2019

(54) METHODS, MEDIUMS, AND SYSTEMS FOR PROVISIONING APPLICATION SERVICES

(71) Applicant: Capital One Services, LLC, McLean, VA (US)

(72) Inventors: Lemin Zhang, McLean, VA (US); Eric Helvey, McLean, VA (US); Ashish Kumar, McLean, VA (US); Michelle Yuan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/253,926

(22) Filed: Jan. 22, 2019

(51) Int. Cl.
*G06F 9/455* (2018.01)
*G06F 9/445* (2018.01)

(52) U.S. Cl.
CPC .......... *G06F 9/45558* (2013.01); *G06F 9/445* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,827,152 B1 | 11/2010 | Gangasharan et al. | |
| 9,703,761 B2 | 7/2017 | Grieve et al. | |
| 2007/0016773 A1* | 1/2007 | Perlman | G06F 21/6218 713/166 |

OTHER PUBLICATIONS

Paulo Dev, "Faster boot on Windows with Delayed Start Services", Feb. 10, 2015, pp. 1-3 (Year: 2015).*
Author unknown, Amazon EC2 Spot Instances [online], [retrieved on Nov. 2, 2018]. Retrieved from Internet URL: https://aws.amazon.com/ec2/spot/.
Author unknown, What does "delayed start" do in startup type for a Windows service? [online], retrieved on Nov. 2, 2018]. Retrieved from Internet URL: https://superuser.com/questions/285653/what-does-delayed-start-do-in-startup-type-for-a-windows-service.
Schoone, M., Improve performance by disabling Windows 7—services [online] [retrieved on Nov. 2, 2018]. Retrieved from Internet URL: http://www.optimizingpc.com/windows7/optimizing_windows_7_services.html.

* cited by examiner

*Primary Examiner* — Gregory A Kessler

(57) ABSTRACT

Exemplary embodiments relate to techniques for improving startup times of a cloud-based virtual servers in response to a spike in service usage (although other applications are contemplated and described). According to some embodiments, in response to a request to provision a new virtual server in a cluster, high-priority services (e.g., those that enable the server to respond to system health checks or that support an application providing the service) are started while lower-priority services are delayed. In some embodiments, prior to receiving such a request, a new server may be started and then hibernated to create a "hot spare." When the request is received, the hot spare may be taken out of hibernation to quickly bring the hot spare online. It is contemplated that the delayed-startup and hot spare embodiments may be used together to further improve performance.

20 Claims, 8 Drawing Sheets

Limited Service Startup Logic
500

Hot Spare Logic 600

METHODS, MEDIUMS, AND SYSTEMS FOR PROVISIONING APPLICATION SERVICES

BACKGROUND

A number of service providers rely on fleets of virtual server instances running applications on third-party provider hardware. An example of such virtual servers include the Elastic Compute Cloud (EC2) service provided by Amazon, Inc. The service provider may run a certain number of virtual server instances depending on the amount of traffic expected to be serviced by the applications. A load balancer, such as an elastic load balancer (ELB) may distribute application load amongst the virtual server instances.

The third-party provider may allow the service provider to dynamically change the number of virtual server instances being run at any given time. This capability is sometimes used to respond to spikes in traffic by quickly adding a new virtual server instance to handle the increased application load. For example, EC2 provides a service referred to as auto scaling groups (ASG), which automatically sets up a new EC2 instance when the traffic load exceeds a predefined threshold.

When a new virtual server instance is started, there is a delay before the instance can begin servicing requests. During this time, the instance may be starting a number of services to allow the instance to operate. Typical startup times may approach or exceed 50 minutes, and while in this startup phase the instance is not capable of responding to system health checks from the load balancer. Consequently, the load balancer is not able to assign a portion of the application load to the instance during startup. Because of these long startup times, the efficacy of dynamically expanding a virtual server pool in response to traffic spikes is reduced.

Moreover, during the instance's startup time, the load balancer may be precluded from adding further instances to the virtual server fleet. Thus, the amount of time required to provision sufficient virtual server instances to handle a traffic spike may be many multiples of the already-long instance startup time.

DETAILED DESCRIPTION

Figure 1:
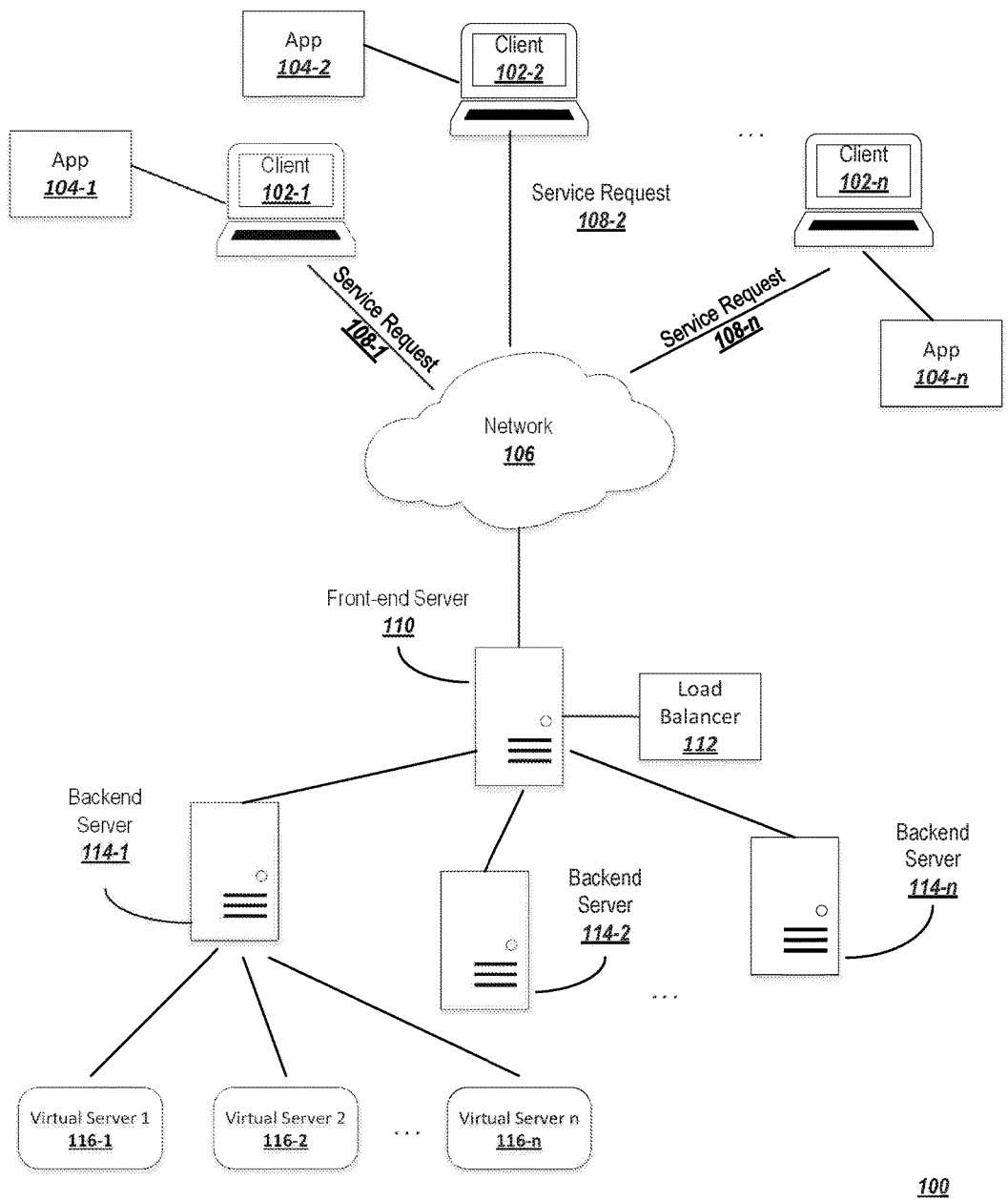
FIG. 1 depicts an environment suitable for practicing exemplary embodiments as described herein.

When a virtual server instance is started, it typically starts up a number of services, such as operating system services, application support services, auditing or monitoring services, compliance services, etc. Starting up these services is a significant contributor to long system startup times.

Exemplary embodiments pertain to methods, mediums, and systems for efficiently and quickly bringing virtual server instances online, especially in response to the provisioning of a new instance based on a spike in application traffic serviced by the instances. Services that are used to support the server's application (e.g., allowing the server to respond to client requests), services that are used to respond to system health checks, and services required by the operating system may be preferentially run at system startup, while other services may be delayed until the system is stable. Accordingly, the server can begin to respond to system health checks sooner.

Separately or in addition, a virtual server may be maintained as a hot spare. The hot spare may be started up and then suspended, hibernated, put to sleep, or some other action that pauses (but does not terminate) the server services. A virtual service provider may not charge for servers that are in such a paused state, and thus the application provider can maintain a server in a ready state so that the server can be unhibernated or otherwise brought online quickly in response to a scale-out event.

These techniques can be combined by starting a virtual server, starting only a minimal set of necessary services, and then hibernating the server in this state. When a new server is called for, the server can be unhibernated and can quickly begin responding to system health checks and client requests. After reaching a stable state, remaining services may be started.

More specifically, according to some embodiments, a virtual server instance may be instantiated. The virtual server instance may support an application and may run multiple services at startup. Prior to or during startup, the services may be analyzed and categorized. For example, one category may include non-deferrable services that are necessary for the virtual server to support the application, while another category may include deferrable services that are not necessary for the virtual server to support the application.

Services that are necessary for the virtual server to support the application may represent services that the application uses to respond to client requests made of the application. Some of these services may be application-specific services, while others may be non-application specific (but nonetheless required for the application to receive and respond to requests, such as certain operating system services and services that allow the server to respond to health checks from the load balancer). Deferrable services, on the other hand, may include services that control user login to the virtual server instance, auditing or monitoring services, secure shell services, system graphics processes, and/or system security processes. Deferring these services may allow, for example, the virtual server to respond to system health checks after the non-deferrable services are started but before the deferrable services are started.

The deferred services may be started up after a predetermined amount of time (e.g., 5-10 minutes), or may be dynamically determined. For example, the deferred services may be started up when the application achieves a certain degree of stability, after the load on the processor associated with the virtual server is below a predetermined threshold amount, or when another system resource (e.g., system memory) reaches a predetermined threshold level of availability.

The services may be analyzed and categorized, and those found to be deferrable may be added to a startup repository. For those services in the startup repository, server startup logic may be adjusted so as to delay execution of the deferable services for a future virtual server instance startup event. For instance, a delay command may be added to a configuration file associated with the deferable service.

In one example, the services may be analyzed and identified during a startup of a virtual server during the normal course of operations in a scale-out event, in which case services may be added to the repository during server startup; when the next server is started in a future scale-out event, the repository may be relied upon to defer execution of the non-essential services at that time. Alternatively or in addition, services may be analyzed a priori, before any scale-out events occur, and this information may be used when the server fleet is initially scaled-out (and each time a scale-out occurs thereafter).

Exemplary embodiments may defer services, low-level system components, processes, daemons, threads, etc. These deferred elements may support an application, executable, etc.

According to further embodiments, which may be used separately or in conjunction with the embodiments discussed above, a hot spare may be maintained in a hibernated, but not terminated, state. The hot spare may be brought online quickly in response to an auto-scaling event.

In order to provide a hot spare, a virtual server instance may be instantiated. The virtual server may be one of multiple virtual servers in a fleet of virtual servers. The virtual server instance may run multiple services, low-level system components, processes, daemons, threads, etc. and may support an application, executable, etc. The virtual server instance may be configured to be capable of responding to network requests relating to the application, executable, etc. using the services, low-level system components, processes, daemons, threads, etc.

Once configured, the virtual server instance may be suspended, hibernated, slept, etc. In some embodiments, running a virtual server instance may be associated with a cost in a billing system, and maintaining a suspended virtual server may be associated with a reduced cost (or no cost).

The suspension may be lifted when it is detected that a load on the fleet of virtual servers is above a predetermined threshold. For example, the suspension may be lifted in response to a listened-for auto-scaling event, such as a Scale-Out InService event. After the suspension is lifted, the server may be capable of providing services associated with the application, executable, etc. According to some embodiments, the application services may become available via the first server within 25 seconds of taking the server out of hibernation.

When the suspension is lifted, a new hot spare may be provisioned. The above actions may be repeated for a new hot spare, which may be suspended to await a future scale-out event.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1 depicts an example of an environment 100 suitable for practicing exemplary embodiments.

Within the environment 100, a number of clients 102-1, 102-2, . . . 102-n each run an application 104-1, 104-2, . . . 104-n that is capable of servicing client requests. To that end, the clients 102-i may transmit service requests 108-i via a network 106 (such as the Internet) to a front-end server 110 associated with the applications 104-i. The front end server 110 may be responsible for servicing requests 108-i using a fleet of virtual servers 116-1, 116-2, . . . 116-n operating on one or more backend servers 114-i. An example of such an environment 100 includes the environment provided via Amazon Web Services (AWS) of Amazon.com, Inc. An example of a virtual server 116-i is an Elastic Compute Cloud (EC2) server.

In order to prevent any one virtual server 116-i from being assigned a disproportionate share of requests 108-i, a load balancer 112 (located at the front-end server 110 in this example, although the load balancer 112 may be provided in a different location or may be a distributed load balancer) assigns incoming requests 108-i to different virtual servers 116-i. The load balancer may, for example, assign incoming requests 108-i at random, in a round-robin fashion, or to the virtual server 116-i deemed to have the lowest processing load or most available system resources, among other possibilities.

When the number or complexity of service requests 108-i received by the load balancer 112 becomes too great (e.g., it exceeds a predetermined threshold rate of requests, or the virtual servers 116-i collectively report lower than a predetermined threshold level of available system resources such as CPU utilization), the load balancer 112 may automatically cause a new virtual server 116-i to be added to the fleet of virtual servers.

An example of this procedure is the auto-scaling groups (ASG) option of AWS. In this procedure, AWS constantly monitors each EC2 instance's CPU utilization. A CPU usage threshold may be defined, above which a message may be sent from AWS's Cloud Watch event monitoring system to an AWS Lambda function. The AWS Lambda function's role is to create a new EC2 instance and attach it to the AutoScaling group (and the load balancer).

Thus, a new virtual server 116-i can be brought online to respond to temporary spikes in traffic, and removed when no longer needed. Meanwhile, the service provider can operate with fewer virtual servers than would otherwise be required to respond to spikey usage patterns, thus saving costs (as virtual server providers typically charge based on the number of active virtual servers 116-i in the fleet at any given time).

After provisioning a new virtual server 116-i, the ASG may send out system health checks to the new virtual server 116-i, which test the virtual server's ability to respond to client requests 108-i. As the virtual server starts up, it is unable to respond to such requests until certain services become available; until those services reach a reasonable stable state, the new virtual server 116-*i* will likely fail the system health checks. The ASG will not send new client requests to the virtual server 116-*i* until the virtual server 116-*i* passes the system health check. Unfortunately, provisioning a new virtual server 116-*i* may take a long time, thus reducing its usefulness in responding to a spike in requests 108-*i*.

Moreover, the ASG may be prohibited from adding further virtual servers 116-*i* until the most-recently-started virtual server 116-*i* passes a system health check. This prevents the virtual server fleet from being scaled out too quickly, but also drastically slows the rate at which new virtual servers 116-*i* can be added in the event of large usage spikes. For example, in some situations, it can take up to 50 minutes to bring a single virtual server 116-*i* online. If three virtual servers are needed to respond to a usage spike, it would be necessary for the load balancer 112 to bring online a first virtual server 116-*i*, wait 50 minutes while the first virtual server starts up, bring a second virtual server 116-*i* online, wait a further 50 minutes, and then bring a third virtual server online. The full capabilities of all three virtual servers would not be available to service new requests for a full 150 minutes after the usage spike occurs, by which time the spike may be over.

Figure 2:
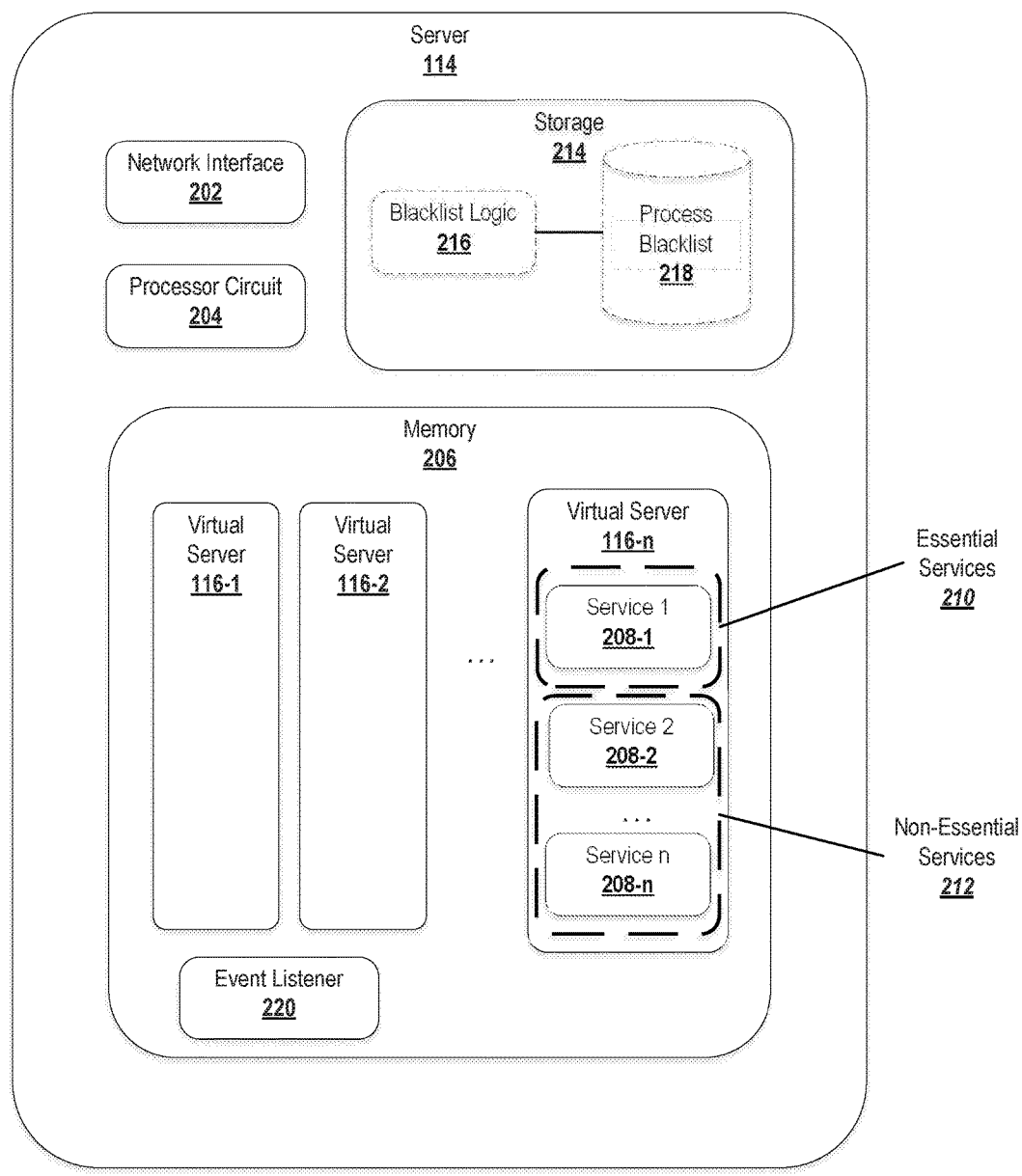
FIG. 2 is a block diagram depicting an example of a server suitable for practicing exemplary embodiments.

Exemplary embodiments take two approaches, which may be used separately or together, to reduce the time between when the virtual server fleet is scaled out by the load balancer 112 and when the new server is able to respond to client requests. In a first approach, non-essential services are blacklisted and deferred upon system startup (a second approach is addressed in connection with FIGS. 3 and 6). An example of a backend server 114 having this capability is depicted in FIG. 2.

The server 114 includes a network interface 202 for receiving and transmitting network requests (e.g., for communicating with the load balancer) and a hardware processor circuit 204 for executing various types of logic.

The server 114 further includes a memory 206, supporting a variety of virtual servers 116-1, 116-2, . . . 116-*n*. Each virtual server may respond to client requests, and to this end run a number of services 208-1, 208-2, . . . 208-*n*. As shown in FIG. 2, some of these services are essential services 210 that must be running to fully respond to requests from clients. These may include application-specific services, but could also include other services without which the application-specific services could not operate (such as operating system services that support the application-specific services and other services that would cause a failed health check). Other services, on the other hand, may be non-essential services 212

The exemplary techniques described herein distinguish which services are essential services 210 and which services are non-essential services 212. The services may be categorized by backlist logic 216 (described in more detail in connection with FIG. 5). The blacklist logic may add the non-essential services 212 to a process blacklist 218 (e.g., a database, table, list, etc.), and the blacklist 218 may be consulted to configure the non-essential services 212 so that they do not start up immediately when the virtual server 116-*i* is started.

According to some embodiments, the non-essential services 212 may be delayed for a predetermined period of time (e.g., 5-10 minutes), which may be selected based on the particular application and the administrator's experience with the server startup times. This predetermined period may be coded into the service's configuration file. For example, some Linux systems support the "systemctl" application, which controls which services start up, how those services are started up, and manages services and daemons for an EC2 instance at any point while the system is running. An option that is available when configuring a particular service using systemctl is the "ExecStartPre" directive. When added to the systemctl configuration file, an ExecStartPre directive instructs systemctl to run a command contained in the directive prior to starting the requested service. Accordingly, if a wait command is added to the directive (such as "/bin/sleep 300"), the service will delay its startup by the specified period of time (300 seconds, or 5 minutes, in this example). The amount of time by which each service may be deferred may be determined experimentally, in simulations, based on administrator knowledge or preferences, etc.

In other embodiments, the services may be started up dynamically when certain conditions are met. For example, when the essential services reach a threshold level of stability, or when system resources exceed predetermined thresholds, non-essential services may be started up.

FIG. 2 depicts the blacklist logic 216 and the blacklist 218 as being stored in a storage 214 on the server 114, although one of ordinary skill in the art will understand that these components may be stored elsewhere. For example, the blacklist logic 216 may be run on a test server and used to generate a blacklist 218, which may be stored at a central location and consulted by the various servers 114.

Alternatively, a whitelist could be created listing the essential services 210. Any service that requests to start up but is not in the whitelist may be deferred on the assumption that it is a non-essential service 212. The blacklist embodiment may result in fewer services being deferred as compared to a whitelist embodiment (thus increasing startup times somewhat), but the whitelist embodiment has the tradeoff that a service which is actually essential but which has not yet been whitelisted may be accidentally deferred (thus running the risk that the system will not be able to respond to health checks until all the services, essential and non-essential, are eventually started). Depending on how conservative the administrator wishes to be, a whitelist approach or a blacklist approach may be employed.

The server 114 also includes an event listener 220, which allows the server 114 to listen for scale-out events from the load balancer, such as "Scale-Out Pending" and "Scale-Out In Service" events). The event listener 220 may register with the load balancer to receive notifications of these events.

Returning to the AGS example, when an AWS Lambda function determines that it is time to create a new EC2 instance, a CloudWatch alert is sent to an AWS simple notification service (SNS) topic. The default ASG Lambda function has registered for that SNS topic and so receives a notification of the CloudWatch alert. As part of its processing of the CloudWatch alert, the Lambda function goes through a series of stages. The Lambda function publishes notifications of its processing of the CloudWatch alert to various SNS topics. With an appropriate level of access, a user can request that other entities (such as Lambda functions, email addresses, SMS messages, etc.) be notified when a new event is published on these SNS topics. One of more of the above-described Lambda functions may serve as an event listener 220.

As mentioned above, the creator of an ASG may request that certain AutoScaling events be sent to custom Lambda functions by registering those functions as a consumer of events in an SNS topic. In this case, two events are of particular significance to exemplary embodiments: the ScaleOut-Pending event and the ScaleOut-InService event. In response to receiving a notification of a ScaleOut Pending event, an exemplary custom Lambda function may unhibernate a hot spare (if one exists) and perform house-keeping actions in the ASG (such as adding the EC2 to the ASG, increasing the maximum number of EC2s in the ASG, adding the EC2 to the load balancer, etc.). In response to receiving the notification of the ScaleOut-InService event, the newly created EC2 may be hibernated and removed from the load balancer, and the maximum number of EC2s in the ASG may be reduced (among other housekeeping tasks).

It is notable that the custom Lambda function can operate without interrupting or overriding the behavior of a standard AWS ASG Lambda function—more functionality is simply implemented with the existing capabilities.

Figure 3:
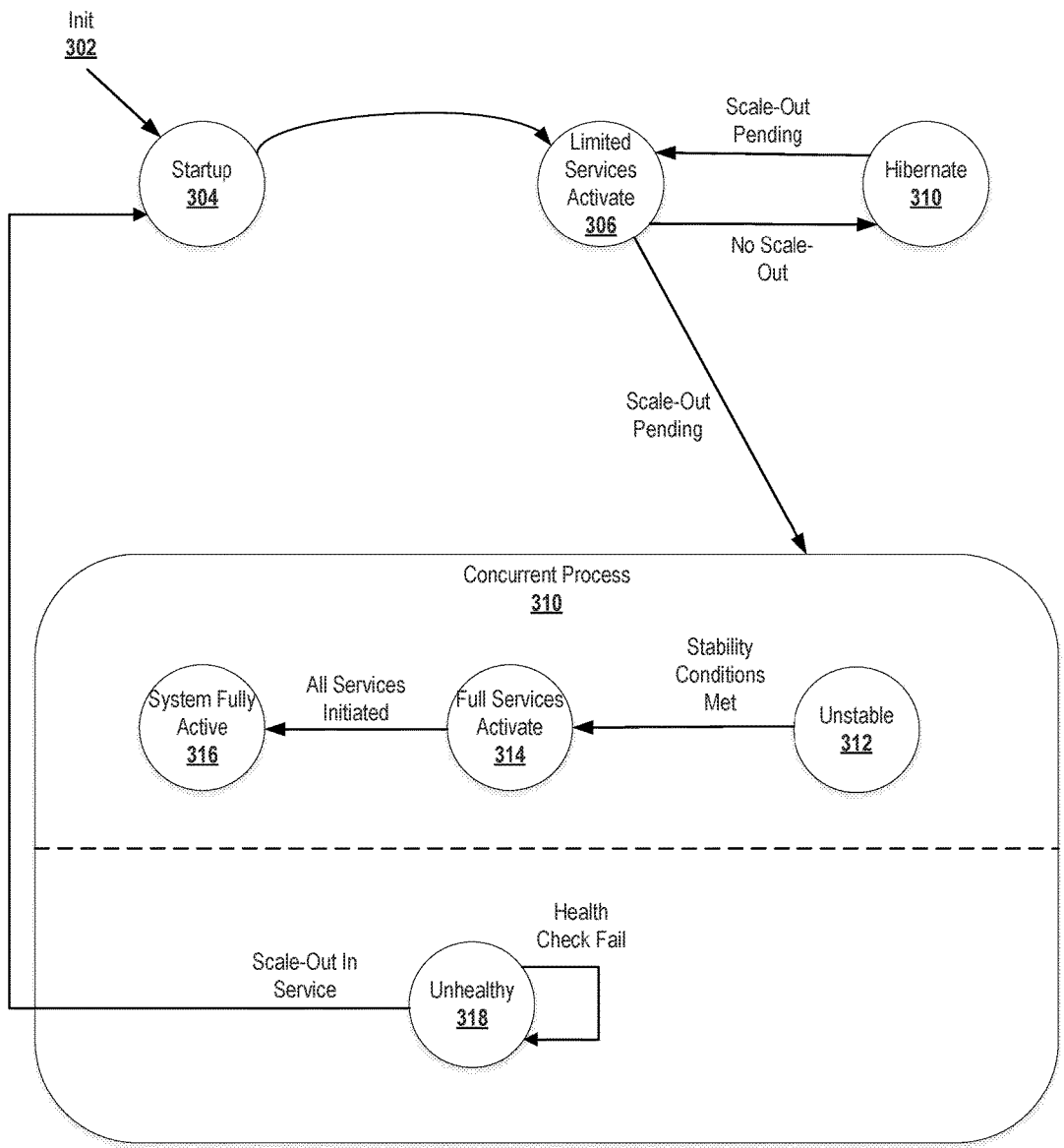
FIG. 3 is a state diagram depicting changes in state undergone by the server according to an exemplary technique.

FIG. 3 is a state diagram depicting the states that a virtual server 116-$i$ progresses through in a typical start-up procedure according to an exemplary embodiment. In this embodiment, non-essential services are deferred, and the system is also maintained as a hot spare by performing initial startup steps and then hibernating the system.

The system starts in an initial state 302, which may be the state when the virtual server fleet is initially created, or when the load balancer determines that a new virtual server should be added to the fleet. Upon starting up a new virtual server, the server will be in a startup state 304 as it is being initially brought online.

During the startup process, the system will attempt to start the services that support the virtual server. The system consults the process blacklist, and, using the services identified in the blacklist, automatically proceeds to the "limited services activate" state 306. In this state, the system starts the non-deferrable services (e.g., in a blacklist embodiment, the system preferentially starts all the services not in the blacklist, while a configuration file or system conditions check prevents the non-deferrable services from starting up).

When the non-deferrable services are active, the system checks as to whether a scale-out is pending (e.g., whether a new virtual server has been requested for the fleet). For example, the event listener may determine if a Scale-Out Pending message has been recently received from the load balancer.

If no scale-out is pending, the system proceeds to the "hibernate" state 310, in which the system is put to sleep, hibernates, or otherwise suspends activity. While in the hibernate state, the system is not able to respond to client requests (e.g., the load balancer cannot assign requests to the system), but the services activated in the limited services activate state 306 are not terminated. In some cases, for example, the portion of the memory stack associated with the services is stored in a storage, so that the service's state can be quickly restored when the system is unhibernated by loading the stored information back into memory. In many virtual server fleets, customers are typically not charged for virtual servers that they maintain in the hibernate state 310.

If a scale-out is initiated (e.g., by the load balancer) while the system is in the hibernate state 310, the system reverts to the limited services activate state 306. At this point, the system restores the limited services that were previously activated (e.g., by loading the service's state into memory as described above), and, because a scale-out is now pending, the system may enter the concurrent process 310.

In the concurrent process 310, two procedures happen in parallel. In the first part of the concurrent process 310, the system begins in an unstable state while the limited services are activated and deferred services await startup. In this state, the system may check to determine whether stability conditions are met (e.g., whether the services are in a stable state and ready to respond to requests, whether system resources are above a predetermined threshold, etc.). If so, the system proceeds to the full services activate state 314.

As an alternative to checking for system stability, the system may check to see whether predetermined amounts of time for which the deferrable services have been delayed have expired. Once these predetermined amounts of time expire, the system enters the full services activate state 314.

In the full services activate state, the system attempts to start the services that were previously deferred. When all the services have been initiated, the system enters a system fully active state 316.

In the second part of the concurrent process 310, the system starts in an unhealthy state 318, in which it is not able to successfully respond to system health checks. As the system fails health checks, it remains in the unhealthy state 318. Once the system successfully responds to a system health check, the load balancer may issue a Scale-Out In Service event, at which point the system is deemed healthy. In order to ensure that a hot spare is always available, a new system is then brought online and the new system proceeds to the startup state.

Figure 4:
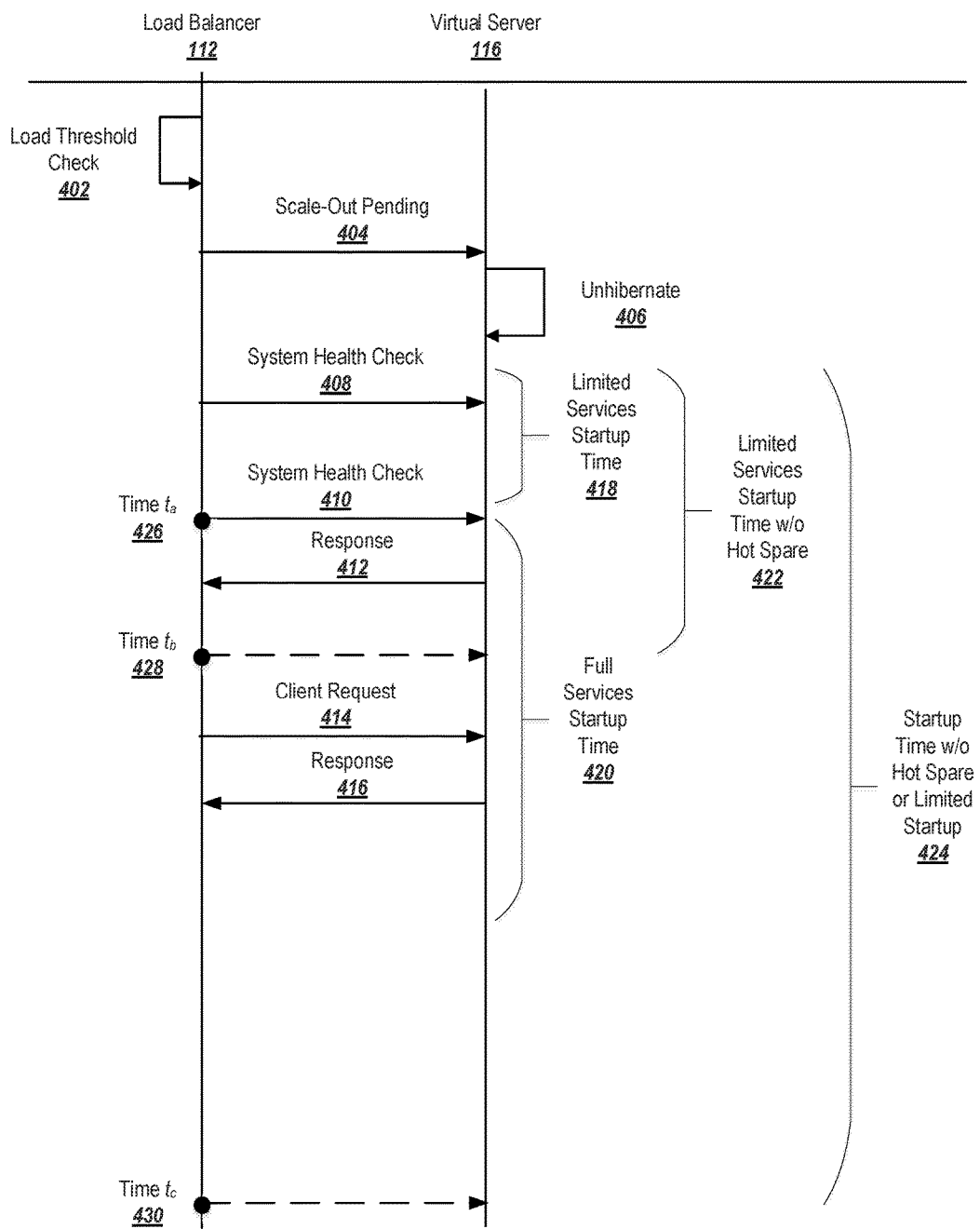
FIG. 4 depicts a data flow diagram showing messages exchanged during an exemplary process.

FIG. 4 depicts a data flow diagram which shows the messages exchanged between the load balancer 112 and the virtual server 116.

The load balancer 112 may periodically perform load threshold checks 402. This may check whether the number or rate of incoming requests exceeds a predetermined threshold, at which point the load balancer is instructed to add a new virtual server to the fleet. In this example, we assume that the virtual server 116 represents a hot spare that has already been started up and hibernated.

If the load threshold is exceeded, the load balancer instructs that the virtual server 116 should be added to the virtual server fleet by transmitting a Scale-Out Pending message 404. The virtual server 116 recognizes the Scale-Out Pending message (e.g., by receiving an notification of the message from the event listener), and unhibernates 406. At this point, the virtual server 116 unsleeps the limited (non-deferrable) services which were already started (while the virtual server 116 was in the "limited services activate" state 306 before it was hibernated.

The virtual server 116 may not be able to bring the slept non-deferrable services back online instantaneously, but can do so relatively quickly. If, before the non-deferrable services are not brought back online before the load balancer issues a system health check, the virtual server 116 may fail to respond to the system health check (or may do so with an incorrect response), and therefore the load balancer 112 does not begin to assign the virtual server 116 new tasks.

After a short amount of time, the non-deferrable services become active again, and the load balancer sends a new system health check 410. At this point, the virtual server 116 is able to appropriately respond to the system health check with a response 412, and the load balancer 112 can now assign tasks to the virtual server 116 (as well as bringing a new hot spare online, or directly adding a further virtual server directly to the virtual server fleet). The load balancer 112 therefore begins sending client requests 414 to the virtual server 116, which are serviced by the non-deferrable services to generate a response 416.

In this example, the limited services were able to be brought online after a certain amount of time 418. When the limited services were brought online, corresponding to time to 426, the virtual server was able to respond to system health checks and receive tasks from the load balancer, even though the virtual server 116 would not be fully provisioned until all of the services were brought online after the full services startup time 420. The example techniques, when implemented in existing computer-implemented systems (and any other qualifiers that may affect performance), may effectively bring a new virtual server online with the essential non-deferrable services (so that it can begin responding to client requests) in 10 seconds or less.

In some cases, the use of a hot spare will not be desired or possible (e.g., if the load balancer 112 adds several virtual servers to the fleet in quick succession, so that it is not possible to start up a hot spare before the next virtual server must be added; this corresponds to proceeding directly from state 304 to state 306 to the concurrent process 310, without proceeding to the hibernating state 310, in FIG. 3). Nonetheless, by deferring non-essential services, the system can still be brought online relatively quickly (typically in 25-45 seconds. Thus, the virtual server 116 can begin to respond to requests at a time $t_b$ 428, which is later than the time to 426 but still much shorter than a time $t_c$ 430, corresponding to an amount of time required to fully provision a new virtual server 116 without deferring non-essential services and without using a hot spare. This corresponds to the startup time 424, which in the inventors' experience can exceed 50 minutes.

Figure 5:
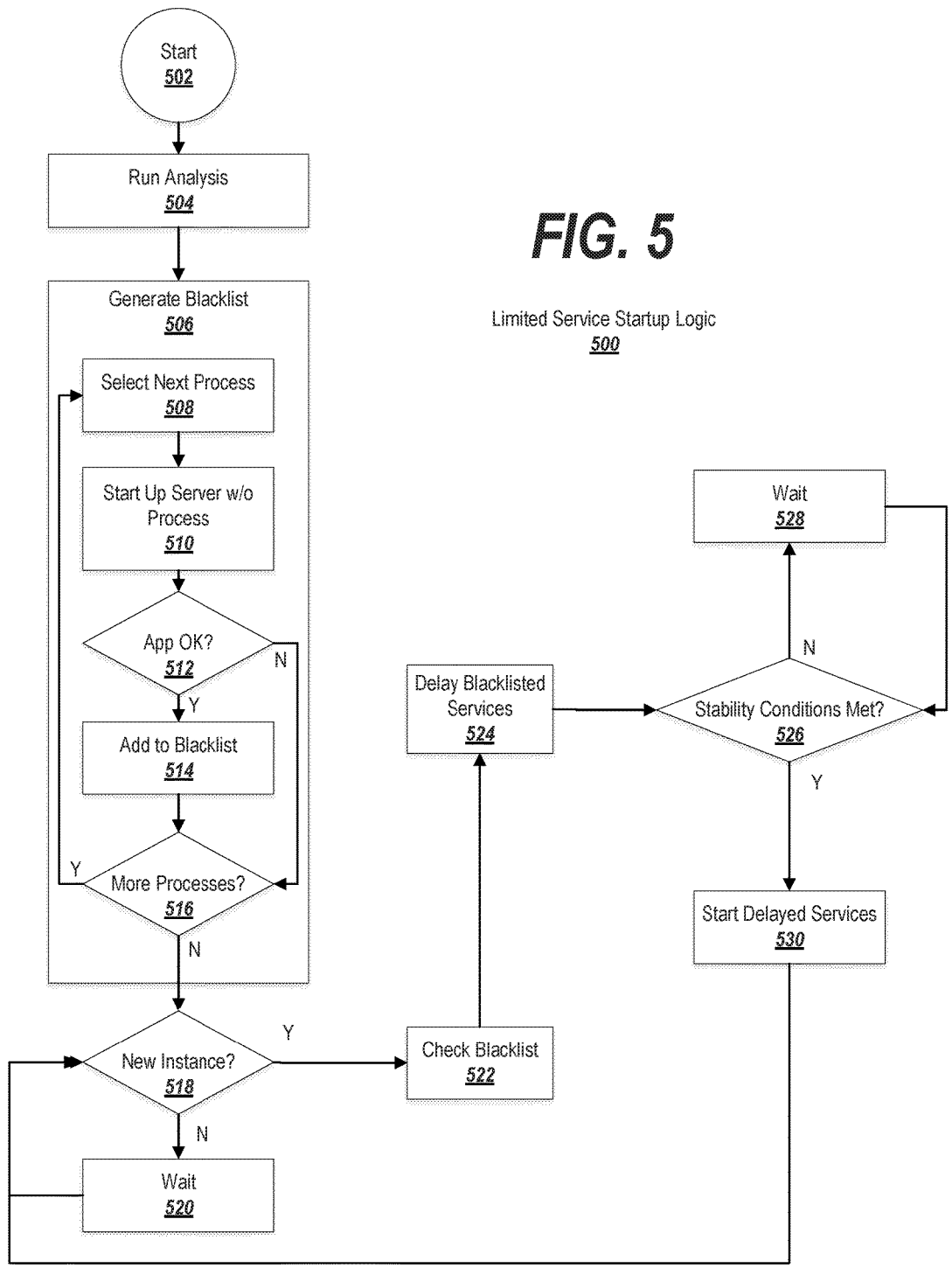
FIG. 5 is a flowchart depicting the deferment of blacklisted services, according to an exemplary embodiment.
Figure 6:
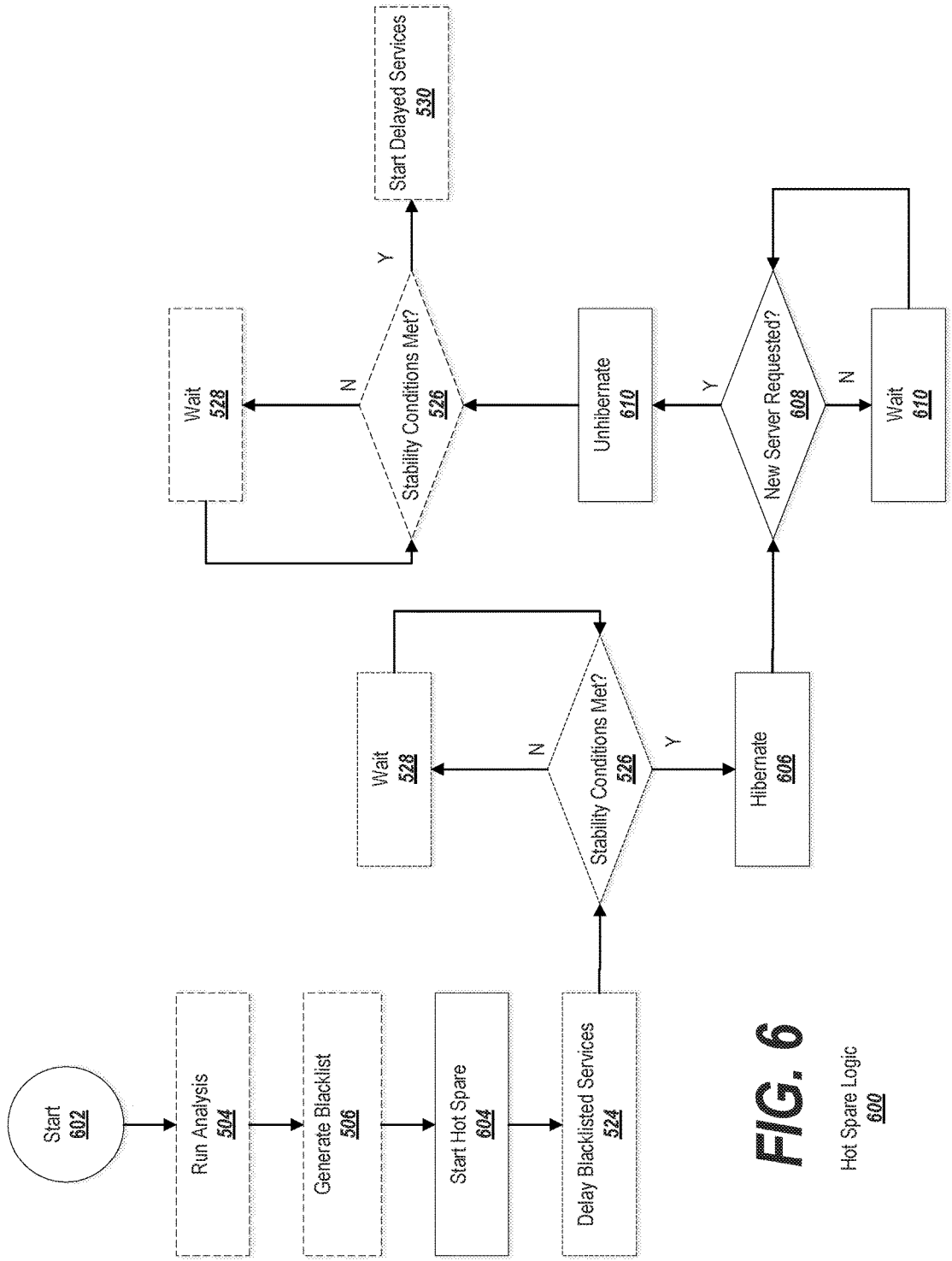
FIG. 6 is a flowchart depicting the provisioning of a hot spare, according to an exemplary embodiment.

The above-described process is but one exemplary embodiment, with particular steps performed in a particular order. One of ordinary skill in the art will recognize that more, fewer, or different steps may be performed, and the steps may be performed in a different order, while remaining within the scope of the invention. FIGS. 5-6 depict various embodiments from different perspectives to further elucidate the invention. Unless otherwise noted, it is contemplated that the logic and procedures described in FIGS. 5-6 may be used in combination with each other and/or in combination with the above-described embodiments.

FIG. 5 is a flowchart depicting logic 500 for performing an exemplary process for starting up only a limited set of non-deferrable services when a virtual server is first added to a fleet.

The process begins at block 502. At block 504, the system may run an analysis of services that are initiated when a new server is started up. This may generate a list of services that can be tested to determine which are essential (non-deferrable) and which are not.

The deferrable services may be added to a blacklist at block 506. As one example of a procedure for generating a blacklist, at block 508 the system may select the next process identified in the list created at block 504. The system may attempt to start up the server without this process at block 510 (e.g., terminating the service immediately upon startup, or otherwise preventing the service from being initiated). The system may then determine, at block 512, whether the system is able to respond to client requests from an application without the service being active. For instance, the system may generate a test request and attempt to service it without the terminated service. If the system crashes or is unable to respond to the request (or responds with an unexpected value), the system may determine that the service is essential (a "N" response at block 512). If an appropriate response can be generated without the service, then the system may determine that the service is non-essential (a "Y" at block 512). The same procedure may be used to test whether the system is able to respond to a test health check.

If the service is deemed to be non-essential at block 512 (a "Y" response), then processing proceeds to block 514 and the service may be added to the blacklist. If not, processing bypasses block 514 and proceeds directly to block 516.

At block 516 is determined whether additional services remain in the list generated during the analysis at block 504. If so, processing returns to block 508 and the next service is tested. After all services have been tested, processing proceeds to block 518.

Blocks 504 and 506 may be performed prior to adding new virtual servers to a virtual server fleet, and may be performed periodically to update the blacklist 506 as new services are added and old services are retired. One of ordinary skill in the art will understand that the procedures outlined in blocks 504 and 506 are only one technique for identifying and deferring non-essential services, and that other techniques may also be employed.

At block 518, the system determines if a new virtual server has been requested (e.g., in response to a Scale-Out Pending event). If not, processing proceeds to block 520 and the system waits a period of time before returning to block 518 and checking again as to whether a new virtual server is requested. If the determination at block 518 is "Y" (i.e., a new virtual server has been requested), processing proceeds to block 522.

As an alternative to such a polling-type system, exemplary embodiments may implement an event-based system, in which a notification received through a Lambda function triggers the startup of a new virtual server (as described above).

At block 522, the system checks the blacklist created at block 506 and identifies which services are deferrable. At block 524, the system delays startup of the blacklisted services using the techniques described above.

At block 526, the system determines whether system stability conditions have been met (or whether the predetermined period of time associated with the deferred services has elapsed, as described above). If not, processing proceeds to block 528 and the system waits a period of time before checking system stability again. If so, processing proceeds to block 530 and the delayed/deferred services are started. Processing then returns to block 518 where the system awaits the provisioning of a new virtual server.

FIG. 6 is a flowchart depicting logic 600 for starting and using a hot spare according to an exemplary embodiment. The hot spare may be used with or without the limited service startup logic described in FIG. 5; the dashed boxes in FIG. 6 correspond to steps from FIG. 5 which may be employed if it is desirable to defer non-essential services on the hot spare. For the sake of brevity, the description of these steps will not be repeated.

The process starts at block 602, at which point the system may optionally generate a blacklist of deferrable services as described above in connection with FIG. 5. At block 604, the system starts the hot spare by provisioning a new virtual server in the virtual server fleet. The system starts up at least the essential services on the virtual server, and may optionally delay the non-essential services as described above in connection with FIG. 5.

At block 606, the new virtual server is hibernated, or enters sleep mode. This may involve suspending, but not terminating, the services on the virtual server, saving the state of the services in a storage, deallocating memory, freeing processing resources, etc.

Subsequently, at block 608, the system determines whether a new server has been requested (e.g., in response to a Scale-Out pending event). If not, processing proceeds to block 610, where the system waits a period of time before checking again at block 608. If a new server has been requested, then processing proceeds to block 610 and the system unhibernates the virtual server that was hibernated in block 606. This may involve, for example, provisioning processor resources, unsuspending services, restoring the state of running services, allocating memory, etc. Optionally, if deferrable services have been identified, the system may wait for an appropriate time and may start the delayed services as outlined above in FIG. 5.

Figure 7:
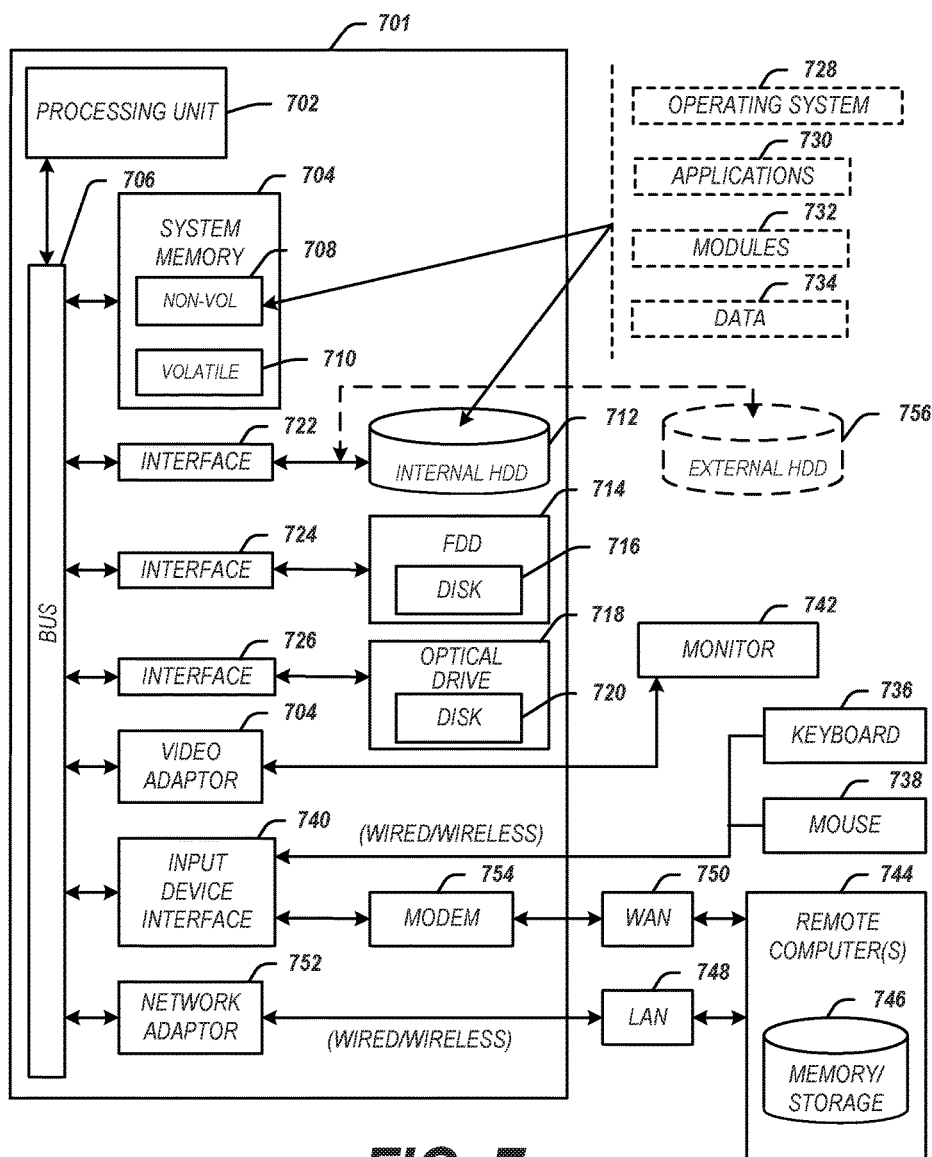
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, 756, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
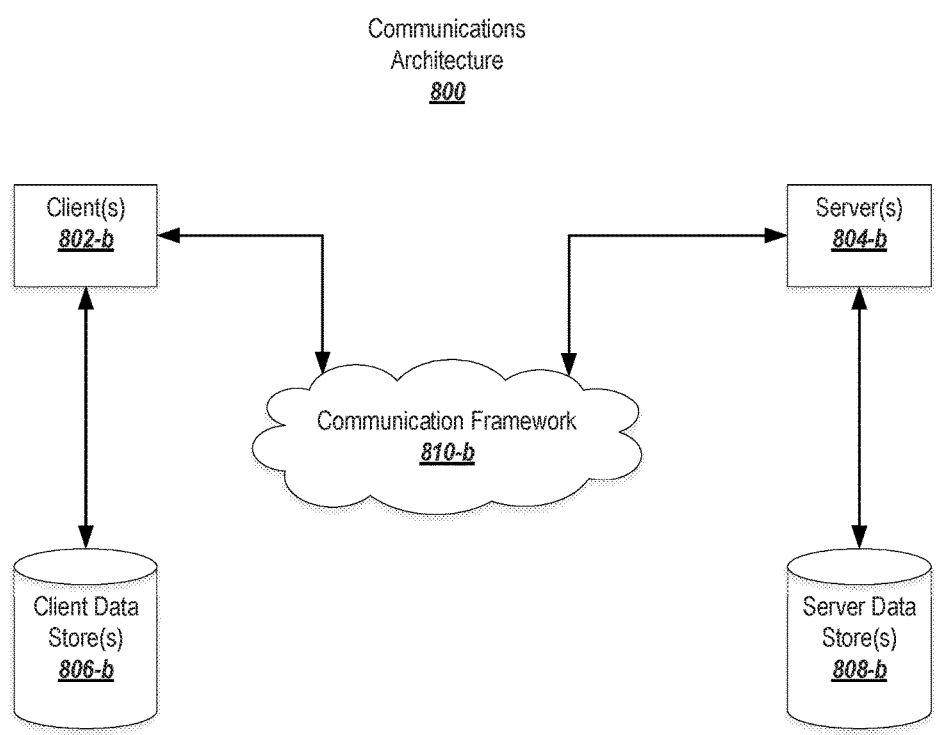
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device described above. The servers 804 may implement the server device descried above. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
    instantiating a virtual server instance, the virtual server instance supporting an application and running a plurality of services at startup;
    analyzing the plurality of services to categorize the services into a group of non-deferrable startup services necessary for the virtual server to support the application and a group of deferrable startup service that are not necessary for the server to support the application;

adding the deferrable startup services to a startup repository;

adjusting server startup logic to delay execution of the deferrable startup services in the startup repository for a future virtual server instance startup event, wherein the execution is delayed for a dynamically determined period of time based on a stability of the application;

receiving a health check request from an elastic load balancer; and providing a positive response to the health check request before the deferrable startup services are run.

2. The method of claim 1, wherein the deferrable startup services comprise one or more services that control user login to the virtual server instance.

3. The method of claim 1, wherein the deferrable startup services comprise at least one of auditing or monitoring services.

4. The method of claim 1, wherein the deferrable startup services comprise at least one of a secure shell service, a system graphics process, or a system security process.

5. The method of claim 1, wherein the non-deferrable startup services further comprise one or more operating system services.

6. The method of claim 1, wherein the non-deferrable startup services comprise one or more services allowing the application to respond to health check requests from a load balancer.

7. The method of claim 1, wherein the future virtual server instance startup event is a virtual server instance startup in response to an automatic scale-out event.

8. The method of claim 1, wherein the startup repository is a programmatically-generated blacklist.

9. The method of claim 1, wherein analyzing the plurality of services comprises attempting to start up the virtual server without a selected service, and determining whether the system is able to respond to client requests associated with the application in the absence of the selected service.

10. A non-transitory computer-readable medium storing instructions that, when executed by a processor circuit, cause the processor circuit to:

receive a request to initialize a server, the server configured to provide application services to one or more users and configured to run a plurality of low-level components upon initialization;

accessing a list of non-essential low-level components that are not essential to providing the application services;

delaying the non-essential low-level components at initialization of the server;

running a remaining set of low-level components that are not the non-essential low-level components while the non-essential low-level components are delayed;

receiving a health check request from an elastic load balancer; and providing a positive response to the health check request before the non-essential low-level components are run.

11. The medium of claim 10, wherein delaying the non-essential low-level components comprises adding a delay command to a configuration file associated with at least one of the non-essential low-level components.

12. The medium of claim 10, wherein the server is a member of an auto-scaling group.

13. The medium of claim 10, wherein the request to initialize the server is received in response to a usage spike relating to the application services.

14. The medium of claim 10, wherein delaying the non-essential low-level components allows the server to provide the application services sooner as compared to a system in which the non-essential low-level components are not delayed.

15. The medium of claim 10, wherein the server is an elastic cloud computing (EC2) server.

16. The medium of claim 10, wherein the list of non-essential low-level components is a programmatically-generated blacklist.

17. An apparatus comprising:

a processor circuit;

a memory storing an execution state for a plurality of executing services and an instance of an executable;

a network interface configured to accept external requests and respond to the external requests via the executable; and deferred service logic executable on the processor circuit and configured to execute a plurality of deferred services that do not directly support the executable, wherein executing the deferred services comprises deferring execution of the deferred services for a period of time after the apparatus is brought online via the network interface, wherein the period of time is a dynamically determined period of time based on a stability of the executable.

18. The apparatus of claim 17, wherein the predetermined period of time is a time in a range of 5-10 minutes.

19. The apparatus of claim 17, wherein the dynamically determined period of time is determined based on a system resource stability.

20. The apparatus of claim 17, wherein the deferred services are selected by:

analyzing a plurality of services accessible to the apparatus;

starting a subset of the plurality of services while preventing a selected group of services from starting; and attempting to respond to client requests associated with the application in the absence of the selected group of services.

* * * * *